United States Patent
Brickell et al.

(10) Patent No.: US 6,950,523 B1
(45) Date of Patent: Sep. 27, 2005

(54) SECURE STORAGE OF PRIVATE KEYS

(75) Inventors: Ernie Brickell, Portland, OR (US);
Matthew D. Wood, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 898 days.

(21) Appl. No.: 09/672,496

(22) Filed: Sep. 29, 2000

(51) Int. Cl.[7] ................................................ H04L 9/00
(52) U.S. Cl. ...................... 380/286; 380/281; 380/277; 713/194; 707/9
(58) Field of Search ............................ 380/21, 49, 25, 380/23, 30, 28, 286, 281, 282–83, 277–79; 713/189, 184, 197; 707/9

(56) References Cited

U.S. PATENT DOCUMENTS

| 5,418,854 A | * | 5/1995 | Kaufman et al. | ............ 713/156 |
| 5,604,801 A | * | 2/1997 | Dolan et al. | ................. 713/159 |
| 5,774,552 A | * | 6/1998 | Grimmer | ..................... 713/156 |
| 6,230,269 B1 | * | 5/2001 | Spies et al. | .................. 713/182 |
| 2002/0178370 A1 | * | 11/2002 | Gurevich et al. | ........... 713/189 |

* cited by examiner

Primary Examiner—Sam Rimell
Assistant Examiner—Jacob F. Betit
(74) Attorney, Agent, or Firm—Pillsbury Winthrop Shaw Pittman LLP

(57) ABSTRACT

To protect a private cryptographic key, two values are derived. The two values together can reconstruct the key. One value is sent to a server and deleted from the local machine. The other value is held by the local machine. To use the key, the user will enter a password, which will be used to authenticate the user to the server, and retrieve the value from the server. The password is also used to unlock the value held by the local machine. The private cryptographic key is thus protected against brute force password attacks without changing the behavior of the user.

13 Claims, 5 Drawing Sheets

SECURE STORAGE OF PRIVATE KEYS

BACKGROUND OF THE INVENTION

1. Field of the Invention

The present invention relates generally to cryptographic systems, and more particularly, to securing private keys in a public key cryptographic system.

2. Description of Related Art

The increasing accessibility of public networks, such as the Internet, allow a wide variety of data to be quickly and cost effectively accessed from virtually anywhere. The Internet, for example, allows users to access databases such as web page servers from any computer connected to the Internet.

One disadvantage with using a public network or an insecure private network to access information is the possibility that sensitive or private information may be accessed, modified, or intercepted by an unauthorized party. These problems can be mitigated, however, by using public key cryptographic systems. In these systems, an authorized person can digitally sign messages to verify their source and information can be encrypted before it is transmitted over the insecure network. The receiver of the signed message will be assured that the message originated from the authorized person. The encrypted information, even if unlawfully intercepted, is not intelligible. In this manner, an insecure network may act functionally like a private and secure network.

The basic components of a public key cryptographic system include a cryptographic algorithm and two numerical codes called keys, one of which is referred to as the public key and the other the private key. To encrypt information, a user inputs a public key to the cryptographic algorithm along with the information to be encrypted. The resultant information, encrypted with the public key, can only be decrypted with the corresponding private key. For example, if a first user encrypts a message with the public key, only the holder of the private key can recover the original message. Even the first user, absent the private key, cannot decrypt the message.

Parties wishing to securely communicate with one another over an insecure network using a public key cryptographic system begin by exchanging their public keys. The sending party then encrypts its information using the second party's public key. The second party decrypts the received information using its private key. Similarly, when digitally signing a document using public key cryptographic systems, the signing party signs the document using its private key. Correctly decrypting the signature with the signing party's public key verifies the identity of the signing party.

For a public key cryptographic system to be reliable, the communicating parties must keep their respective private keys secure. A user's private key is typically stored at the user's computer. To guard against someone stealing the private key, either by unauthorized physical or logical (i.e., programmatical) access to the user's computer, conventional public key encryption systems encrypt the user's private key using a symmetric encryption algorithm that uses a single key based on a password entered by the user. The encrypted version of the private key is only secure, however, if the user uses a "strong" password. Weak passwords—passwords that are short or based on real words—are vulnerable to brute force cracking algorithms that discover a private key by decrypting the stolen but encrypted version of the private key by methodically trying a large number of possible passwords.

Strong passwords are passwords that are long enough so that a brute force attack is not likely to be able to guess the correct password. Strong passwords, although desirable from a security standpoint, are not particularly user friendly. Users do not like to type in long phrases every time they begin a secure session. Additionally, strong passwords can be difficult to remember.

Accordingly, there is a need in the art to improve the user friendliness of passwords used to protect a private key without compromising the security offered by strong passwords.

BRIEF DESCRIPTION OF THE DRAWINGS

The accompanying drawings, which are incorporated in and constitute a part of this Specification, illustrate an embodiment of the invention and, together with the description, explain the objects, advantages, and principles of the invention. In the drawings.

DETAILED DESCRIPTION

The following detailed description refers to the accompanying drawings that illustrate the embodiments of the present invention. Other embodiments are possible and modifications may be made to the embodiments without departing from the spirit and scope of the invention. Therefore, the following detailed description is not meant to limit the invention. Rather the scope of the invention is defined by the appended claims.

As described herein, a key protection server is connected via a network to a user's computer. The key protection server and the user's computer each store a portion of the information needed to compute the user's private cryptographic key. The user additionally protects his private key with a password, which may be a weak password. A security breach at either the key protection server or the user's computer does not jeopardize the user's private key, even to standard brute force attacks.

Figure 1:
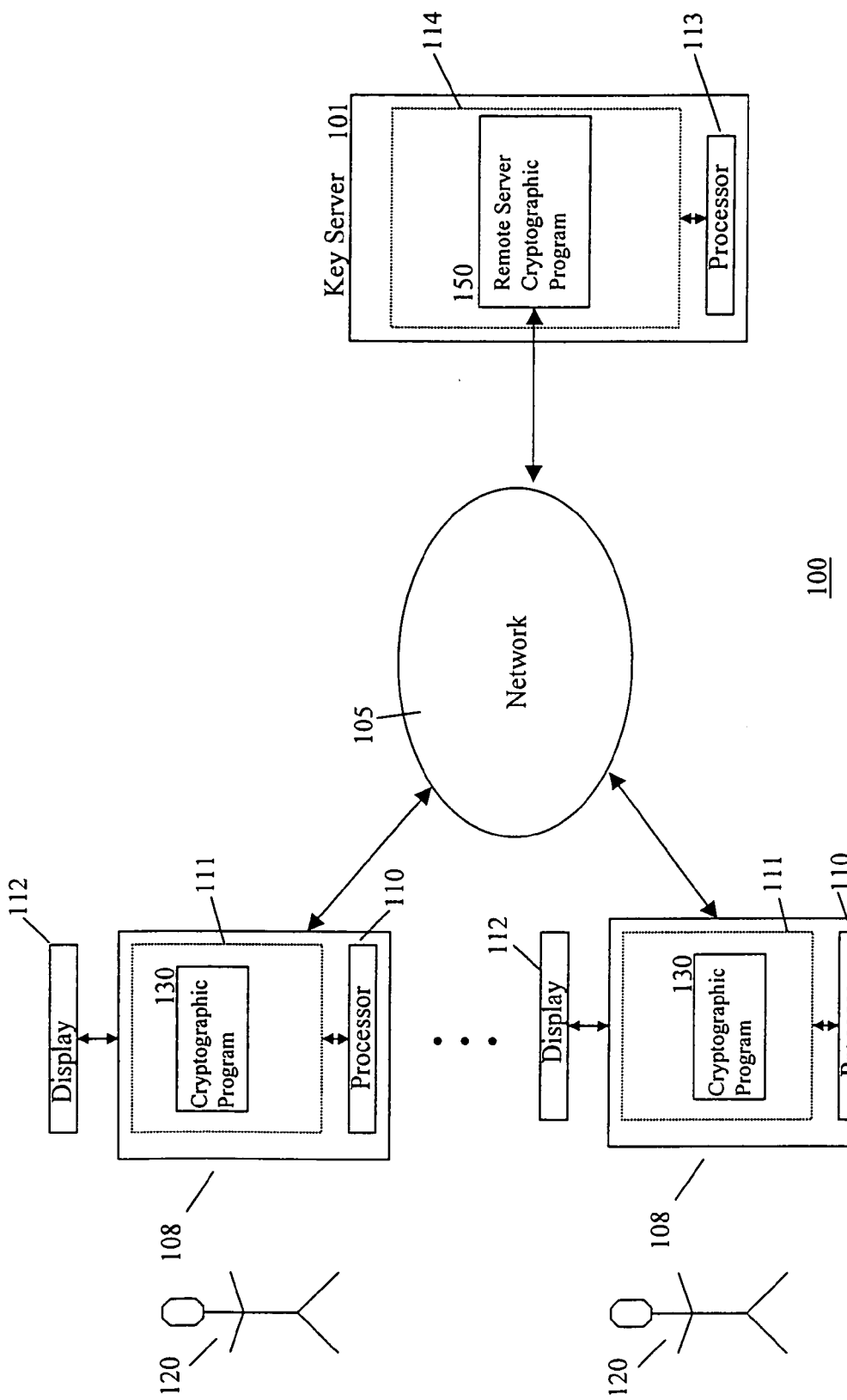
FIG. 1 a diagram illustrating an exemplary computer network on which concepts consistent with the present invention may be implemented.

FIG. 1 is a diagram illustrating an exemplary computer network in which concepts consistent with the present invention may be implemented. The computer network includes multiple client computers 108 coupled to network 105, which may be, for example, the Internet. Client computers 108 each typically include a processor 110 operatively coupled to computer memory 111 and a display 112. Processor 110 executes program instructions stored in computer memory 111, such as cryptographic program 130.

Users 120 may use any of client computers 108 to communicate with key server 101. In general, key server 101 assists users 120 in managing their private keys.

Client cryptographic program 130, which is described in more detail below, encrypts, decrypts, and/or digitally signs information being transmitted to and received from other users 120. Additionally, client cryptographic program 130 communicates with key server 101 to securely store the private keys of users 120. Although shown as a single program, cryptographic program 130 may be a multitude of cryptographic programs, each providing part of the functionality of cryptographic program 130.

As with client computers 108, key server 101 includes at least one processor 113 and a computer memory 114. Memory 114 includes remote server cryptographic program 150, which interfaces with client computer cryptographic programs 130.

Remote server cryptographic program 150, as will be described in more detail below, stores a portion of the information needed to compute a user's private key along with additional user identifying information. Cryptographic program 130 and remote server cryptographic program 150 operate together to securely compute the user's private key in the user's computer memory 111.

Client computers 108 and key server 101 may either accept program instructions from a computer storage device (e.g., optical or magnetic disk) or from network 105. BIOS code (i.e., computer instructions) causing the system to implement the disclosed techniques may be programmed into a non-volatile portion of computer memories 111 and 114. The BIOS may be programmed when the system is manufactured or may be later delivered via a computer readable medium.

Client processors 110 and key server processor 113 can be any of a number of well known computer processors, such as processors from Intel Corporation, of Santa Clara, Calif. More generally, client computers 108 may be any type of computing platform connected to a network and that interact with application programs, such as a personal digital assistant or a "smart" cellular telephone or pager.

Figure 2:
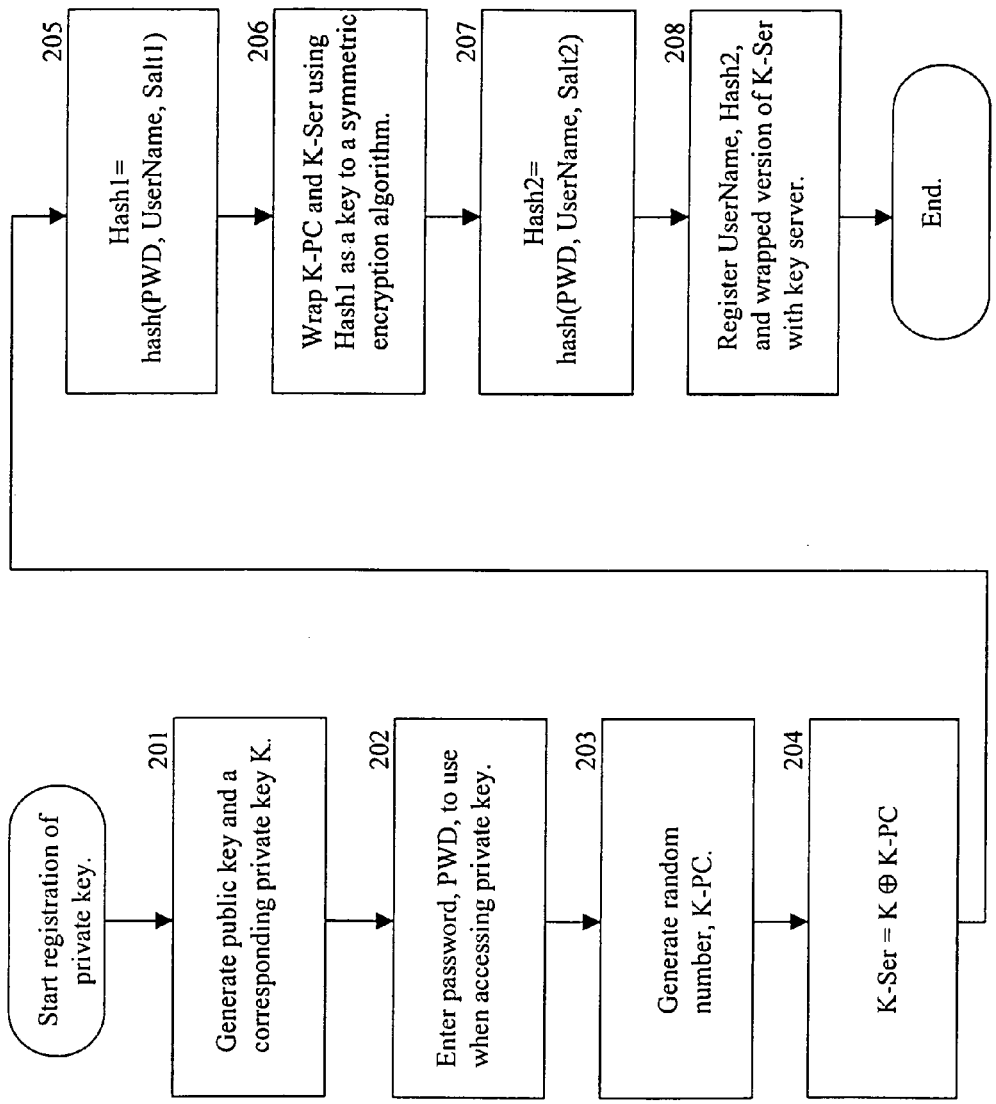
FIG. 2 is a flow chart illustrating a method for registering a private key with a key server according to methods consistent with the present invention.

Before a client computer can begin to securely communicate using public key encryption with another party, it first generates a public/private key pair. As mentioned, consistent with an aspect of the present invention, a portion of the information needed to compute the generated private key is stored at key server 101. FIG. 2 is a flow chart illustrating a method for registering the private key with the key server 101.

The client computer begins by generating a public and a corresponding private key (Act 201). The public key may be freely distributed. It is desirable to keep the private key, labeled as key K, as secure as possible. To this end, the user enters a password, PWD, to help protect the private key K. (Act 202). The password PWD may be of any length. In addition to generating the private key K, the client computer also generates a random number, K-PC, which is larger than the private key K. (Act 203). Generation of public/private key pairs and random numbers are well known in the art and will thus not be described further.

The client computer 108 next computes a derivative of the private key K and the random number K-PC, called K-Ser, by exclusive ORing these two numbers. (Act 204). In this manner, K-Ser, related to the private key K, is created by client 108. At this point, private key K may be deleted from memory 111 of client 108.

Client computer 108 further enhances the security of K-PC and K-Ser by encrypting them using a symmetric encryption algorithm having a key based on a hash of the user's password PWD and login name. More particularly, client computer 108 computes a hash value, Hash1, based on the user's password PWD, user name, and a fixed random value (Salt1). (Act 205). User names (also called login names), are commonly used in the computer art to identify users to a computer or network. With Hash1 in hand, K-PC and K-Ser are "wrapped" using an encryption key based on Hash1. (Act 206). Wrapping a value refers to encrypting the value using a symmetric encryption algorithm. The encryption key used to wrap K-PC and K-Ser may be Hash1 itself, or a variation of Hash1 designed to yield an appropriate length encryption key. K-PC and K-Ser can only be unwrapped with the encryption key used to wrap them.

A second hash value, Hash2, is generated by client computer 108. (Act 207). As with Hash1, Hash2 is based on the user's password PWD, user name, and a second fixed random value (Salt2). Salt1 and Salt2 are fixed random numbers that, once initially generated, are stored at client computer 108.

Hash1 and Hash2 may be implement by different mathematical hashing functions or the same hashing function. The PKCS #5 encryption suite, available from RSA, Inc., of Bedford, Mass., includes suitable cryptographically secure hashing algorithms. In general, hashing algorithms take arbitrary strings as input, and produce an output of fixed size that is dependent on the input. Ideally, it should never be possible to derive the input data given the hash algorithm's output. For a hashing algorithm to be cryptographically secure, it must be very difficult to find two input strings that produce the same output hash value, or to find an input string that produces a given hash value. Because Salt1 and Salt2 are different values, the values of Hash1 and Hash2 will necessarily be, to a statistical certainty, different from one another.

Having wrapped K-PC and K-Ser, client computer 108 registers with key server 101 by sending the user name, Hash2, and the wrapped version of K-Ser to key server 101. (Act 208). These values are stored at the key server. Communications between the client computer and the key server may be performed using the well known SSL (secure socket layer) protocol to further enhance security.

Salt1, Salt2, and the wrapped version of K-PC are stored at the client computer 108. Other values generated by client 108, such as K-Ser, the wrapped version of K-Ser, and K, are not permanently stored at client 108.

Figure 3:
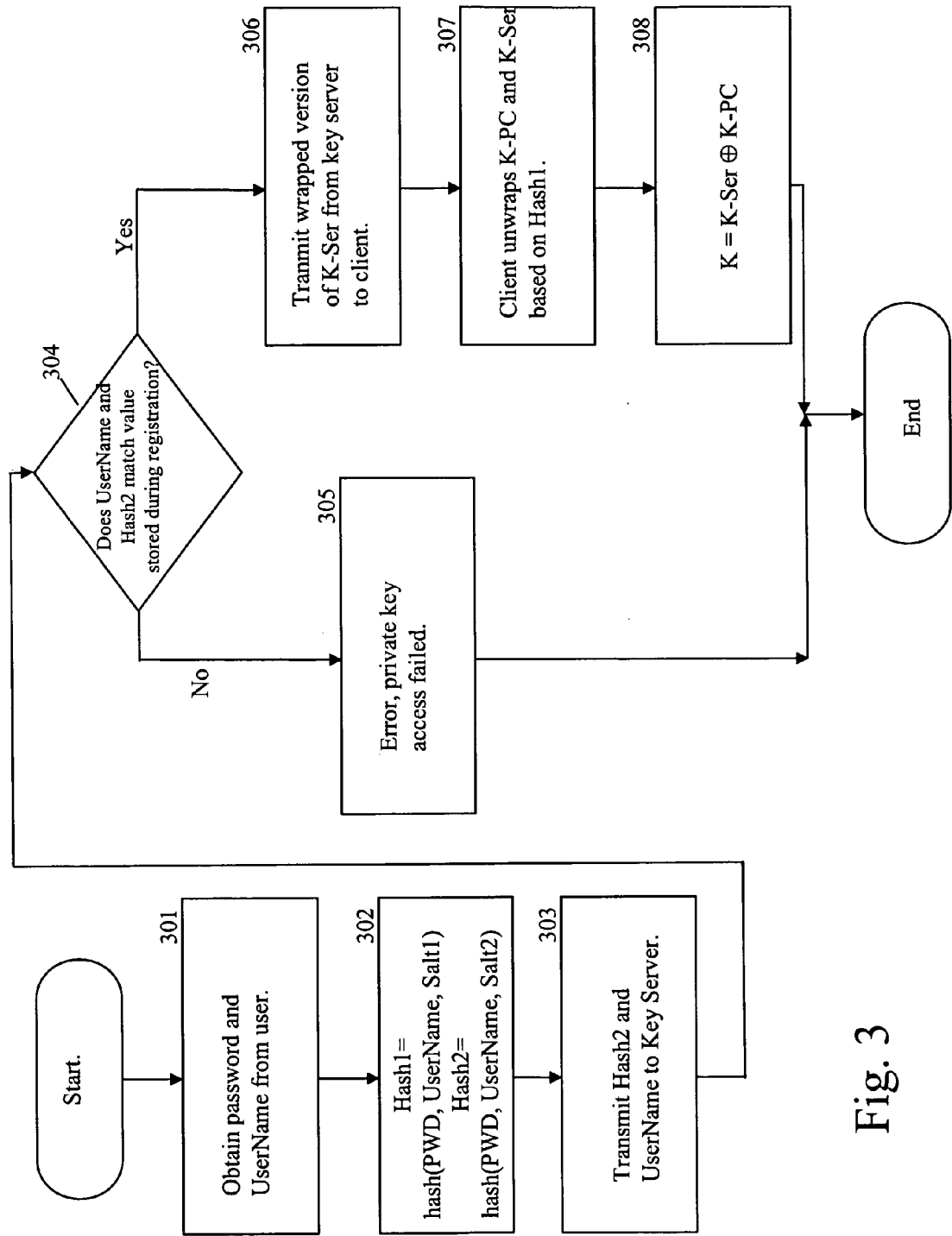
FIG. 3 is a flow chart illustrating a method for accessing a user's private key that has been registered with a key server.

FIG. 3 is a flow chart illustrating a method for reconstructing the user's private key at client computer 108. The private key is required whenever the user would like to sign a message or read a document encrypted with the user's public key.

Client computer 108 begins by obtaining the user name and password. (Act 301). With these two values, and Salt1 and Salt2, client computer 108 generates Hash1 and Hash2. (Act 302). Hash2 and the user name are then sent to key server 101. (Act 303). If the received value for the user name and Hash2 match the values stored by the key server during registration, key server 101 responds by transmitting the wrapped version of K-Ser back to the client computer. (Acts 304, 306). The client then unwraps K-Ser and K-PC based on Hash1, (Act 307), and calculates the private key K by performing a logical exclusive OR of the K-Ser and K-PC. In this manner, the private key K is obtained and may be used in subsequent public key cryptographic sessions.

If Hash2 and the user name compared in Act 304 do not match the values stored by the key server during registration, key server 101 denies access to K-Ser. (Act 305). For each user name, the server will place an upper bound on the number of incorrect values of Hash2 that can be given before some preventative action is taken. For example, after 5 consecutive unsuccessful values, the server may not allow any more attempts for retrieval by that user name for a period of 1 hour and may send an email or other communication to the user notifying them of the unsuccessful attempts. If the user had not actually made these attempts, the user would be advised to change their password. After 25 unsuccessful values, not necessarily consecutive, the server may lock the account until there is some out-of-band communication with the user. The numbers 5, 25, and 1 hour are examples, and may be different in actual use.

Client computer 108, after obtaining the private key K, may delete the calculated intermediate values K-Ser, Hash1, and Hash2.

A user may want to have the server store more than one key. For example, it is common practice to use a different private/public key pair for encryption than for digital signatures. A user may use the same value of Hash2 for multiple keys. In this case, the user could request the values of K-Ser for multiple keys with a single request to the server.

A user may want to change their password PWD. To do this, the client program asks the user to enter their old password once, and their new password twice. The client program goes through the procedure described above to retrieve the user's private key using the old password. Then the client program goes through the procedure to store the private key using the new password. Server 101 could then delete the old stored values of Hash-2 and K-Ser. The server may want to have the user authenticate themselves, such as through a digital signature with the user's private key or through sending the old Hash-2 along with the new Hash-2, before the server deletes the old stored values.

With the private key storage system and method described above, even if an unauthorized party breaks into one of client computers 108 and steals the wrapped version of K-PC, Salt1, and Salt2, it would still be very difficult to derive the private K. A brute force attack, for example, even if it was able to guess the correct password, and thus unwrap K-PC, would have no way of knowing that it had the correct K-PC without having K-Ser. If an adversary tried to test for the correct password by computing and sending values of Hash2 to the server, the server will only allow a limited number of guesses. Similarly, if security at key server 101 is compromised and K-Ser accessed, a brute force attack would not be able to derive K without K-PC.

An alternate embodiment consistent with the present invention for storing and retrieving a user's private key using a key server will now be described with reference to FIGS. 4 and 5.

Figure 4:
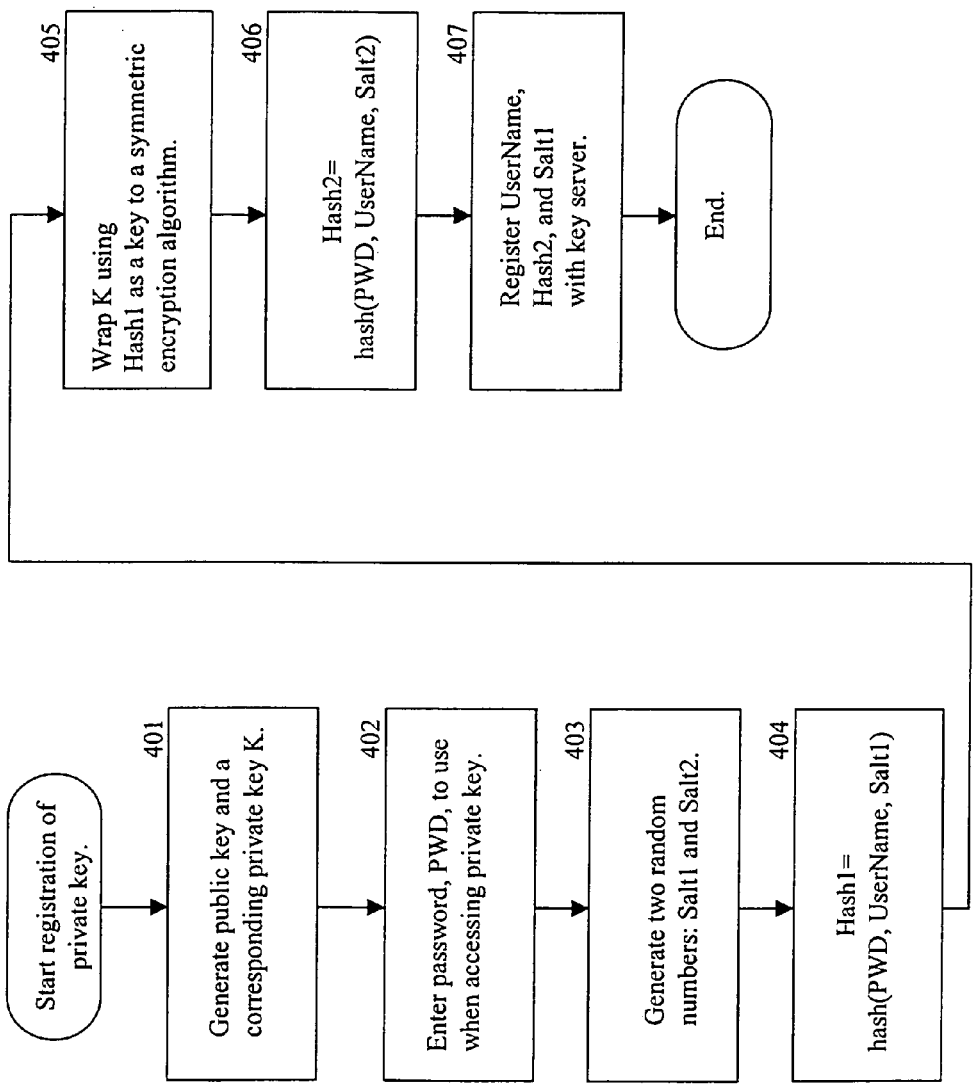
FIG. 4 is a flow chart illustrating a second method for registering a private key with a key server according to methods consistent with the present invention.

FIG. 4 is a flow chart illustrating a second method for registering a private key.

The client computer begins by generating a public and a corresponding private key. (Act 401). The public key may be freely distributed. It is desirable to keep the private key, labeled as key K, as secure as possible. To this end, the user enters a password, PWD, to help protect the private key K. (Act 402). The password PWD may be of any length. In addition to generating the private key K, the client computer also generates two fixed random values, Salt1 and Salt2. Salt1 and Salt2 should be relatively long, such as 160 bits in length. (Act 403).

Client computer 108 further enhances the security of K by encrypting it using a symmetric encryption algorithm having a key based on a hash of the user's password PWD and login name. More particularly, client computer 108 computes a hash value, Hash1, based on the user's password PWD, user name, and the fixed random value (Salt1). (Act 404). With Hash1 in hand, K is wrapped using an encryption key based on Hash1. (Act 405). The encryption key used to wrap K may be Hash1 itself, or a variation of Hash1 designed to yield an appropriate length encryption key. K can only be unwrapped with the encryption key used to wrap it.

A second hash value, Hash2, is generated by client computer 108. (Act 406). As with Hash1, Hash2 is based on the user's password PWD, user name, and a second fixed random value (Salt2). Salt2 is a fixed random number that, once initially generated, is stored at client computer 108.

Having wrapped K and computed Hash2, client computer 108 registers with key server 101 by sending the user name, Hash2, and Salt1 to key server 101. (Act 407). These values are stored at the key server. At this point, private key K and Salt1 may be deleted from memory 111 of client 108. Communications between the client computer and the key server may be performed using the well known SSL (secure socket layer) protocol to further enhance security.

Salt2, and the wrapped version of K are stored at the client computer 108. Other values generated by client 108, such as Salt1, and K, are not permanently stored at client 108.

Figure 5:
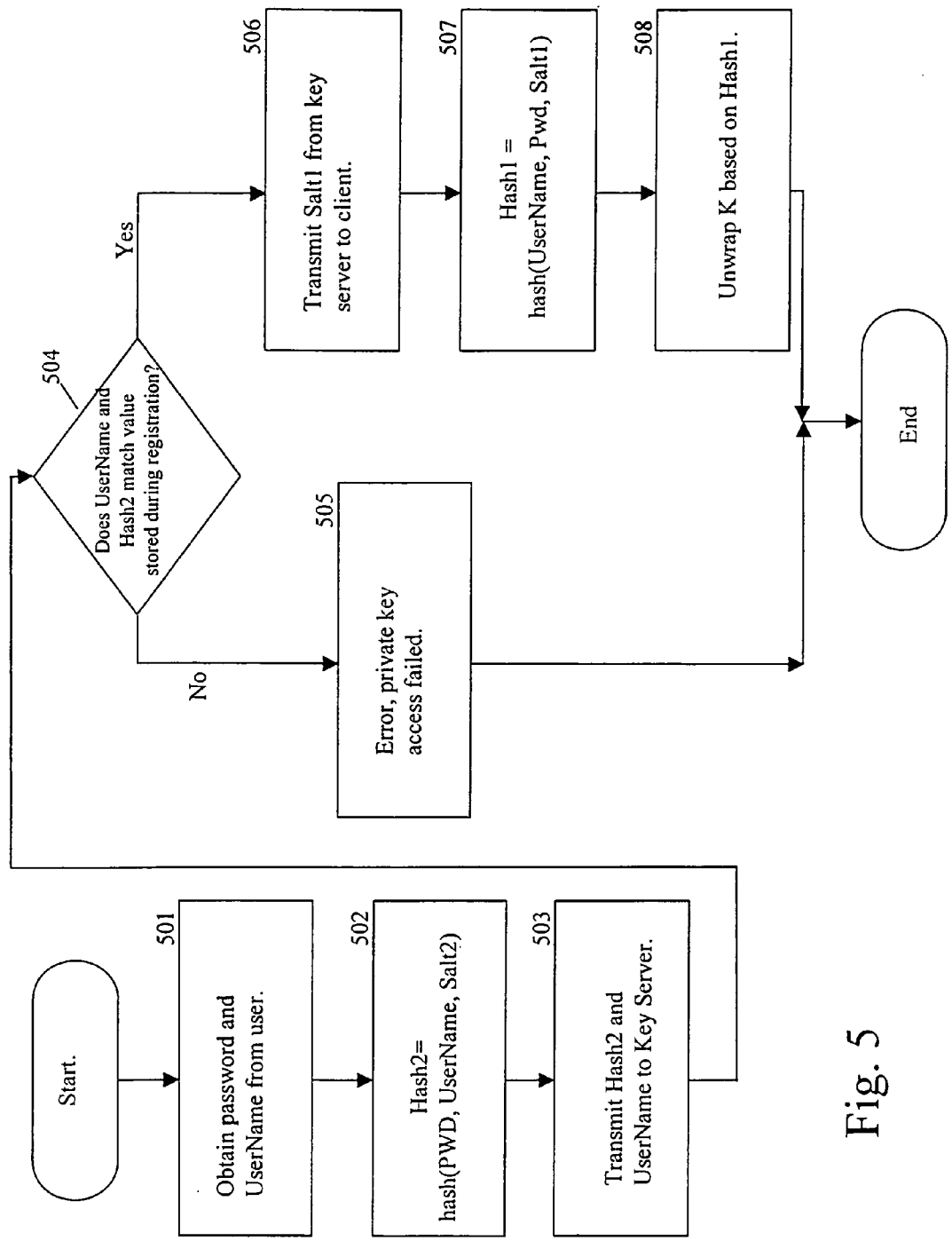
FIG. 5 is a flow chart illustrating a method for accessing a user's private key.

FIG. 5 is a flow chart illustrating a method for reconstructing the user's private key at client computer 108. The private key is required whenever the user would like to sign a message or read a document encrypted with the user's public key.

Client computer 108 begins by obtaining the user name and password. (Act 501). With these two values, and Salt2, client computer 108 generates Hash2. (Act 502). Hash2 and the user name are then sent to key server 101. (Act 503). If the received value for the user name and Hash2 match the values stored by the key server during registration, key server 101 responds by transmitting Salt1 back to the client computer. (Acts 504, 506). The client then generates Hash1 from the user name, the password PWD, and Salt1. (Act 507). The client then unwraps K based on Hash1, (Act 508). In this manner, the private key K is obtained and may be used in subsequent 5 public key cryptographic sessions.

If Hash2 and the user name compared in Act 304 do not match the values stored by the key server during registration, key server 101 denies access to Salt1. (Act 505).

Client computer 108, after obtaining the private key K, may delete the value of Salt1.

With the private key storage system and method described above, even if an unauthorized party breaks into one of client computers 108 and steals the wrapped version of K and Salt2, it would still be very difficult to derive the private key K. To find K, the value of Hash1 is necessary, and Hash1 can only be computed if the user's password PWD, the login name and Salt1 are known. Thus without Salt1, K cannot be unwrapped. A brute force attack to guess the value of Salt1 would be infeasible (if Salt1 is chosen to be a large enough size, such as 160 bits). If an adversary tried to test for the correct password by computing and sending values of Hash2 to the server, the server will only allow a limited number of guesses. Similarly, if security at key server 101 is compromised and Salt1 is accessed, K could not be determined without the value of the wrapped K.

As an alternative to the above-described methods, in which the user is authenticated at the remote server based on a password, a biometric device may instead be used to authenticate the user.

It will be apparent to one of ordinary skill in the art that the embodiments as described above may be implemented in many different embodiments of software, firmware, and hardware in the entities illustrated in the figures. The actual software code or specialized control hardware used to implement the present invention is not limiting of the present invention. Thus, the operation and behavior of the embodiments were described without specific reference to the specific software code or specialized hardware components, it being understood that a person of ordinary skill in the art would be able to design software and control hardware to implement the embodiments based on the description herein.

The foregoing description of preferred embodiments of the present invention provides illustration and description, but is not intended to be exhaustive or to limit the invention to the precise form disclosed. Modifications and variations are possible consistent with the above teachings or may be acquired from practice of the invention. The scope of the invention is defined by the claims and their equivalents.

What is claimed:

1. A method of generating and transmitting a private encryption key, comprising:
   generating a public encryption key and a private encryption key at a client system;
   inputting a password and generating a random number;
   creating a random private key by exclusive-ORing the private key with the random number;
   generating a first hash value by hashing the password, a username, and a constant value;
   encrypting the random private key using the first hash value as an encryption key to create an encrypted random key;
   generating a second hash value by hashing the password, the username, and a second constant value; and
   transmitting the username, the second hash value, and the encrypted random key to a sever for storage.

2. The method of claim 1, further including further authenticating a user at the server.

3. The method of claim 2, wherein the method of authenticating is using a biometric device.

4. The method of claim 1, further including deleting the private encryption key from the client system.

5. The method of claim 1, further including deleting the constant value from the client system.

6. A computer readable medium containing instructions for execution by a processor, the instructions, which when executed, cause the processor to:
   generate a public encryption key and a private encryption key at a client system, which includes the processor;
   receive a password and generate a random number;
   create a random private key by exclusive-ORing the private key with the random number;
   generate a first hash value by hashing the password, a username, and a constant value;
   encrypt the random private key using the first hash value as an encryption key to create an encrypted random key;
   generate a second hash value by hashing the password, the username, and a second constant value; and
   transmit the username, the second hash value, and the encrypted random key to a server for storage.

7. The computer-readable medium of claim 6, including instructions, which when executed causes the processor to delete the private encryption key from the client system.

8. The computer-readable medium of claim 6, including instructions, which when executed causes the processor to delete the constant value.

9. The computer-readable medium of claim 6, including instructions, which when executed causes the processor to delete the second constant value.

10. A method for retrieving a stored password, comprising:
    receiving a password and a username;
    generating a first hash value using the password, the username, and a first constant value;
    generating a second hash value using the password, the username, and a second constant value;
    transmitting the second hash value and the username to a key server;
    receiving an encrypted random private key from the key server when the username and the second hash value match a stored username value and a stored hash value; and
    decrypting the encrypted random private key using the first hash value as an encryption key to generate a random private key.

11. The method of claim 10, further including exclusive-ORing a random number with the random private key to generate a private key.

12. A computer readable medium containing instructions for execution by a processor, the instructions, which when executed, cause the processor to:
    receive a password and a username;
    generate a first hash value using the password, the username, and a first constant value;
    generate a second hash value using the password, the username, and a second constant value;
    transmit the second hash value and the username to a key server;
    receive an encrypted random private key from the key server when the username and the second hash value match a stored username value and a stored hash value; and
    decrypt the encrypted random private key using the first hash value as an encryption key to generate a random private key.

13. The computer-readable medium of claim 12, including instructions, which when executed causes the processor to exclusive-OR a random number with the random private key to generate a private key.

* * * * *